(12) United States Patent
Pollington et al.

(10) Patent No.: US 8,092,767 B2
(45) Date of Patent: *Jan. 10, 2012

(54) METHOD OF DECOMPOSING NITROGEN DIOXIDE

(75) Inventors: Stephen David Pollington, Tyne and Wear (GB); Raj Rao Rajaram, Slough (GB); Andrew Peter Walker, Malvern, PA (US)

(73) Assignee: Johnson Matthey Public Limited Company, London (GB)

( * ) Notice: Subject to any disclaimer, the term of this patent is extended or adjusted under 35 U.S.C. 154(b) by 907 days.

This patent is subject to a terminal disclaimer.

(21) Appl. No.: 10/553,490

(22) PCT Filed: Apr. 19, 2004

(86) PCT No.: PCT/GB2004/001680
§ 371 (c)(1),
(2), (4) Date: Jun. 16, 2006

(87) PCT Pub. No.: WO2004/094045
PCT Pub. Date: Nov. 4, 2004

(65) Prior Publication Data
US 2006/0263285 A1    Nov. 23, 2006

(30) Foreign Application Priority Data

Apr. 17, 2003 (GB) .................................. 0308944.8
Aug. 13, 2003 (GB) .................................. 0318982.6

(51) Int. Cl.
*B01D 53/56* (2006.01)
*B01D 53/94* (2006.01)
*C01B 21/00* (2006.01)

(52) U.S. Cl. .................. 423/213.2; 423/235; 423/239.1; 423/213.7; 423/213.5; 423/239.2; 502/309; 502/242; 502/60; 502/350; 502/355; 60/286; 60/297; 60/295; 60/303; 60/311

(58) Field of Classification Search .................. None
See application file for complete search history.

(56) References Cited

U.S. PATENT DOCUMENTS 4,902,487 A    2/1990    Cooper et al.
(Continued)

FOREIGN PATENT DOCUMENTS

CA    2159956 A1    4/1996
(Continued)

OTHER PUBLICATIONS

California's Diesel Risk Reduction Program, Sep. 2000, Title 13, California Code of Regulations, Chapter 14, Section 2706.
(Continued)

*Primary Examiner* — Melvin Mayes
*Assistant Examiner* — Smita Patel
(74) *Attorney, Agent, or Firm* — Kevin M. Carroll

(57) ABSTRACT

A method of decomposing nitrogen dioxide to nitrogen monoxide in an exhaust gas of a lean-burn internal combustion engine, such as a diesel engine, comprises adjusting the C1 hydrocarbon:nitrogen oxides (C1 HC:$NO_x$) ratio of the exhaust gas to from 0.1 to 2 and contacting this exhaust gas mixture with a particulate acidic refractory oxide selected from the group consisting of zeolites, tungsten-doped titania, silica-titania, zirconia-titania, gamma-alumina, amorphous silica-alumina and mixtures of any two or more thereof and passing the effluent gas to atmosphere.

16 Claims, 15 Drawing Sheets

U.S. PATENT DOCUMENTS

| | | | |
|---|---|---|---|
| 5,524,432 | A | 6/1996 | Hansel |
| 5,746,989 | A * | 5/1998 | Murachi et al. ............ 423/213.7 |
| 5,776,423 | A | 7/1998 | Feeley et al. |
| 5,788,936 | A | 8/1998 | Subramanian et al. |
| 6,202,407 | B1 | 3/2001 | Brusasco et al. |
| 6,314,722 | B1 | 11/2001 | Matros et al. |
| 2002/0029564 | A1 | 3/2002 | Roth et al. |
| 2002/0197191 | A1 | 12/2002 | Takeshima et al. |
| 2004/0045285 | A1 | 3/2004 | Penetrante et al. |
| 2004/0187456 | A1 | 9/2004 | Bruck |

FOREIGN PATENT DOCUMENTS

| | | | |
|---|---|---|---|
| EP | 0 341 832 | A2 | 11/1989 |
| EP | 0 541 271 | A1 | 5/1993 |
| EP | 0 582 743 | A1 | 2/1994 |
| EP | 0 709 129 | A1 | 5/1996 |
| EP | 0 758 713 | A1 | 2/1997 |
| EP | 0 888 816 | A1 | 1/1999 |
| EP | 1 057 519 | A1 | 12/2000 |
| JP | 62-163731 | A | 7/1987 |
| JP | 5-96132 | A | 4/1993 |
| JP | 8-103656 | A | 4/1996 |
| JP | 2722987 | | 11/1997 |
| JP | 11-47605 | | 2/1999 |
| JP | 11-300211 | | 11/1999 |
| JP | 2000-97016 | A | 4/2000 |
| JP | 2000-199423 | A | 7/2000 |
| JP | 2002-35587 | A | 2/2002 |
| WO | WO-98/40153 | | 9/1998 |
| WO | WO-01/63104 | A1 | 8/2001 |
| WO | WO-02/31325 | A1 | 4/2002 |
| WO | WO-03/033118 | A1 | 4/2003 |
| WO | WO-03/037507 | A1 | 5/2003 |
| WO | WO-03/038248 | A1 | 5/2003 |
| WO | WO-2004/030798 | A1 | 4/2004 |

OTHER PUBLICATIONS

Barry J. Cooper et al., "Role of NO in Diesel Particulate Emission Control," SAE Paper No. 890404.

Office Action mailed Jul. 30, 2009 in U.S. Appl. No. 11/665,308.

Miller et al., "The role of acid sites in cobalt zeolite catalysts for selective catalytic reduction of NOx," *Catalysis Letters* 51 (1998), pp. 15-22.

English translation of Notice of Opposition dated Mar. 22, 2010, Opposition by Umicore AG & Co. KG to EP-B-1 613 417.

* cited by examiner

METHOD OF DECOMPOSING NITROGEN DIOXIDE

This application is the U.S. National Phase application of PCT International Application No. PCT/GB2004/001680, filed Apr. 19, 2004, and claims priority to British Patent Application No. 0308944.8, filed Apr. 17, 2003, and British Patent Application No. 0318982.6, filed Aug. 13, 2003.

FIELD OF THE INVENTION

The present invention relates to a method of decomposing nitrogen dioxide ($NO_2$) in a gas mixture to nitrogen monoxide (NO), for example an exhaust gas mixture of an internal combustion engine.

BACKGROUND OF THE INVENTION

Exhaust gases from internal combustion engines comprise a mixture of pollutants including carbon monoxide (CO), unburned hydrocarbons (HC), nitrogen oxides ($NO_x$) and particulate matter (PM). The $NO_x$ component can comprise nitrogen monoxide (NO) and nitrogen dioxide ($NO_2$). The level of these pollutants in exhaust gases from internal combustion engines it is permissible to exhaust to atmosphere is regulated by legislation. Such legislation can be met by engine design, engine management and/or exhaust gas aftertreatment, and typically a combination of all three measures.

A prior art exhaust system primarily for treating diesel exhaust comprises an oxidation catalyst for oxidising NO in the exhaust gas to $NO_2$ and a downstream filter for trapping PM. A process for treating diesel PM that uses this arrangement is described in EP 0341382 or U.S. Pat. No. 4,902,487, both of which are incorporated herein by reference. The process comprises passing an exhaust gas, such as a diesel exhaust gas, including PM and NO unfiltered over an oxidation catalyst to convert the NO to $NO_2$, collecting PM on the filter and combusting the collected PM by reaction with the $NO_2$. This, technology is commercially available as Johnson Matthey's Continuously Regenerating Trap or CRT®. Combustion of the PM in $NO_2$ results in CO and NO, with a potential side-reaction leading to the complete reduction of the $NO_2$ to $N_2$ as described in SAE 890404.

An advantage of this process is that it is possible to combust diesel PM at temperatures of up to 400° C., whereas combustion of diesel PM in oxygen occurs at about 500° C. and above. This is significant since diesel exhaust gas is generally cooler than exhaust gas from gasoline engines and PM would accumulate on the filter causing back-pressure problems in the system if the process relied solely on combustion of PM in oxygen without provision of additional means for increasing the exhaust gas temperature; so-called "active" regeneration regimes.

A problem with the process described in EP 0341382 is that, as exhaust emission legislation has tightened since the publication of that application, legislative bodies have begun to discuss limiting the amount of $NO_2$ it is permissible to exhaust to atmosphere. For example, the California Air Resources Board (CARB) has proposed that a maximum of 20% of tailpipe $NO_x$ of the relevant drive cycle is emitted as $NO_2$ (See California's Diesel Risk Reduction Program, September 2000 and Title 13, California Code of Regulations, Chapter 14, section 2706.). $NO_2$ is toxic and can cause headaches, dizziness and nausea in low doses. It also has an objectionable smell. If there is insufficient PM on the filter to react with $NO_2$ generated over the oxidation catalyst or the temperature of the exhaust gas is below a preferred range for combustion of PM in $NO_2$, $NO_2$ can slip past the filter and be undesirably exhausted to atmosphere.

This problem is particularly acute when internal combustion engines are used in confined spaces, such as mines, where vehicles are used to drill for, load, and transport mined material to the surface. Many mining operations generate particulate matter, and so exhaust aftertreatment systems comprising filters for reducing the levels of PM emitted are being considered. Furthermore, explosives used to blast rock to recover a desired ore can generate $NO_2$. Accordingly, it would be an advantage to reduce the exhaust gas emissions of both PM and $NO_2$ to the atmosphere in closed environments to improve the health and safety of miners. Indeed, the US Mine Safety and Health Administration prevents the use of diesel exhaust systems comprising diesel particulate filter systems that increase $NO_2$ emissions.

In selective catalytic reduction (SCR) by hydrocarbons (HC), HC react selectively with $NO_x$, rather than with $O_2$, to form nitrogen, $CO_2$ and water according to equation (1):

$$\{HC\} + NO_x \rightarrow N_2 + CO_2 + H_2O \quad (1)$$

The competitive, non-selective reaction with oxygen is given by Equation (2):

$$\{HC\} + O_2 \rightarrow CO_2 + H_2O \quad (2)$$

Two preferred groups of HC-SCR catalysts to selectively promote the desired reaction (1) for catalysing HC-SCR of $NO_x$ (HC-SCR catalysts are also referred to as "lean $NO_x$ catalysts" (LNC), "DeNO$_x$ catalysts", "$NO_x$ occluding catalysts", "$NO_x$ reducing catalysts" and even "non-selective catalytic reduction catalysts" (because they can catalyse non-selective reactions e.g. Equation (2)). These two preferred groups are platinum on alumina and copper-substituted zeolite such as Cu/ZSM-5.

Pt-based catalysts tend to operate at relatively low temperature (peak activity ~250° C.) and have a relatively narrow temperature window for HC-SCR activity whereas zeolite-based HC-SCR catalysts have a wider temperature window than Pt-based HC-SCR catalysts and operate at higher temperatures (peak activity ~400° C.).

One potential solution to this problem is described in EP 0758713, where in one embodiment, an exhaust system comprises an optionally platinum-based oxidation catalyst and a diesel particulate filter (DPF) in the CRT® configuration and a $NO_x$ absorbent downstream of the DPF. The $NO_x$ absorbent can comprise platinum for oxidising NO to $NO_2$ in lambda >1 exhaust gas compositions, rhodium for reducing $NO_x$ to $N_2$ in lambda <1 exhaust gas compositions and at least one substance selected from alkali metals such as potassium and caesium; alkali-earth metals such as barium and calcium; and rare-earth metals such as lanthanum for absorbing the $NO_2$ and storing it as the nitrate. Catalyst compositions comprising platinum, rhodium and a $NO_x$ absorbent material are typically called $NO_x$ traps.

In a second embodiment of EP 0758713, a $NO_x$ reducing catalyst is disposed downstream of the filter for catalysing the reduction of the $NO_x$ to $N_2$ using diesel HC fuel and CO. The $NO_x$ reducing catalyst can be a zeolite such as ZSM-5 ion exchanged with copper or iron, or mordenite supporting platinum. However, it is clear from EP 0758713 that HC reductant for reducing the $NO_x$ is introduced into the exhaust system either by injecting additional fuel during the exhaust cycle or directly into the exhaust passage. In either case, injection is done always upstream of the CRT® oxidation catalyst.

EP 0888816 discloses an exhaust emission control catalyst containing the three metals copper, praseodymium and yttrium, wherein the hydrocarbon: nitrogen oxide mole ratio is within a range of from 0.5 to 30.

EP 0541271 discloses a catalyst system for treating $NO_x$ in the exhaust from a lean-burn gasoline-fueled engine, which system comprising a first stage catalyst containing a transition metal-exchanged zeolite (i.e. Cu-ZSM5), and a second stage catalyst, which is a three-way catalyst, for treating the effluent from the first stage catalyst. The engine is controlled such that the ratio of $NO_x$ to HC in the exhaust gas is in the range of from 1/3 to 3/1 (i.e. minimum $C_3H_6$ of 250 ppm and $NO_x$ of 200-400 ppm). Only the performance of the second stage catalyst and the first and second stage catalysts in combination is assessed in the Examples.

WO 03/037507 describes an exhaust system for an internal combustion engine comprising a catalyst, such as a platinum-based catalyst, for oxidising NO to $NO_2$ when the exhaust gas composition is lambda >1; and a filter disposed downstream of the NO oxidation catalyst, i.e. in the CRT® configuration. The filter can comprise an oxidation catalyst such as platinum and/or palladium, rhodium and a $NO_x$ absorbent material, such as any of those described in EP 0758713 above. A filter component of this arrangement is described in Japanese patent no. 2722987.

SUMMARY OF THE INVENTION

We have investigated ways of catalytically decomposing $NO_2$ to NO and we have found that, very surprisingly, relatively acidic particulate refractory oxide materials are particularly active. In order to optimise conversion, we found that a relatively small amount of HC reductant is desirable. Without wishing to be bound by any theory, we believe that the HC forms a coke on the acidic materials and it is this that promotes the decomposition of $NO_2$ to NO. Certain metals can be included in the acidic materials to promote such coking, some of which metallised materials are known HC-SCR catalysts. Of course, the object of the HC-SCR is to convert all $NO_x$ to $N_2$ and for this purpose C1 HC:NOx ratios of from between 2 and 6 (see for example our WO98/40153) are preferred in the above-mentioned temperature windows. Whilst our results show that a relatively small amount of reduction to $N_2$ is effected, very good $NO_2$ conversion to NO can be achieved at much lower temperatures and C1 HC:$NO_2$ ratios than for HC-SCR.

BRIEF DESCRIPTION OF THE DRAWINGS

In order that the invention may be more fully understood, the following Examples are provided by way of illustration only and with reference to the accompanying drawings, in which.

DETAILED DESCRIPTION OF THE INVENTION

Figure 1:
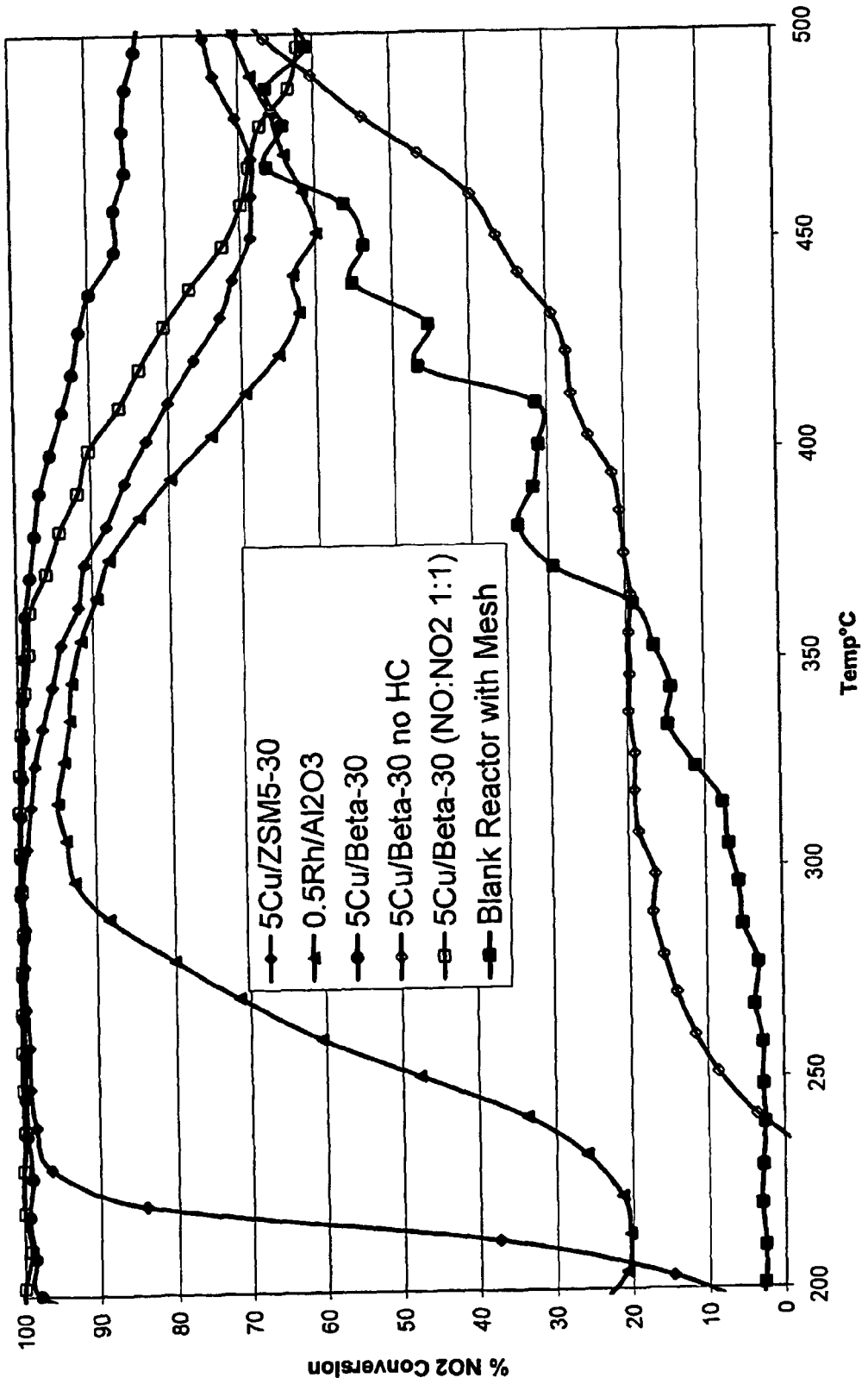
FIG. 1 is a graph showing % $NO_2$ conversion as a function of temperature (° C.) for $NO_2$ decomposition catalysts with and without diesel fuel injection (about 120 ppm C1 (MK1)) relative to a blank reactor control.

According to a first aspect, the invention provides a method of decomposing nitrogen dioxide ($NO_2$) to nitrogen monoxide (NO) in an exhaust gas of a lean-burn internal combustion engine, which method comprising adjusting the C1 hydrocarbon:nitrogen oxides (C1 HC:$NO_x$) ratio of the exhaust gas to from 0.1 to 2 and contacting this gas mixture with a particulate acidic refractory oxide selected from the group consisting of zeolites, tungsten-doped titania, silica-titania, zirconia-titania, gamma-alumina, amorphous silica-alumina and mixtures of any two or more thereof and passing the effluent gas to atmosphere.

In one embodiment, the particulate refractory oxide supports a metal or a compound thereof, which metal being selected from the group consisting of rhodium, palladium, iron, copper and mixtures of any two or more thereof.

$NO_2$ can account for up to about 50% NOx in the exhaust gas of an internal combustion engine. Therefore, according to one embodiment the HC:$NO_2$ ratio is adjusted to from 0.2 to 4.

We have found that for the prescribed HC:$NO_x$ ratios, $NO_2$ conversion is reduced at lower temperatures. In order to meet the proposed CARB threshold of a maximum of 20% $NO_2$ of $NO_x$ emitted, in one embodiment we prefer that the step of adjusting the HC:$NO_x$ ratio is performed only when the exhaust gas temperature is at 250° C. and above. It will be noted that $NO_2$ conversion is possible at temperatures much below that required for HC-SCR for a similar catalyst i.e. above 250° C. for $NO_2$ conversion vs. about 400° C. for HC-SCR over Fe-Beta zeolite.

According to a further embodiment, the step of adjusting the HC:$NO_x$ ratio is done when the exhaust gas temperature is in a range that has been pre-determined to produce increased $NO_2$ in the exhaust system. Such temperature range will usually depend on the engine type and the duty of the vehicle.

Illustrative embodiments include city centre buses comprising heavy duty diesel engines (250-300° C.); buses in non-city centre locations (up to 400° C.); and heavy duty diesel trucks (up to 500° C.).

Potentially, the method according to the first aspect of the invention can be used to treat gas mixtures including $NO_2$ generated by any chemical, e.g. industrial, process. However, for the purposes of the present invention, the method is for treating an exhaust gas mixture derived from combustion of a hydrocarbon fuel, such as diesel fuel, gasoline fuel, natural gas (NG) or liquid petroleum gas (LPG) in an internal combustion engine.

According to a second aspect, the invention provides an exhaust system for an internal combustion engine, which system comprising a catalyst for decomposing nitrogen dioxide ($NO_2$) to nitrogen monoxide (NO) with a suitable reductant, and means, in use, for adjusting the C1 hydrocarbon:nitrogen oxides (C1 $HC:NO_x$) ratio in an exhaust gas upstream of the catalyst to from 0.01 to 2, which catalyst consisting of a particulate acidic refractory oxide selected from the group consisting of zeolites, tungsten-doped titania, silica-titania, zirconia-titania, gamma-alumina, amorphous silica-alumina and mixtures of any two or more thereof optionally supporting a metal or a compound thereof, which metal being selected from the group consisting of rhodium, palladium, iron, copper and mixtures of any two or more thereof.

In one embodiment, the means for adjusting is adapted to adjust the C1 $HC:NO_2$ ratio of the exhaust gas to from 0.05 to 1.

According to a further embodiment, the adjustment means is controlled, in use, to operate when the exhaust gas temperature is above 250° C.

In another embodiment, the adjustment means is controlled, in use, to operate when the exhaust gas temperature is below 500° C.

Control of the adjustment means can be effected by suitable means comprising, in one embodiment, a processor which in turn can form part of the engine control unit (ECU) if desired.

In order to control the C1 $HC:NO_x$ ratio, it is desirable that the system comprises one or more sensors for inputting the status of one or more of the following conditions in the system: exhaust gas temperature; catalyst bed temperature; exhaust gas mass flow; $NO_2$ in the exhaust gas, e.g. as detected by a suitable $NO_2$ sensor; manifold vacuum; ignition timing; engine speed; throttle position; lambda value of the exhaust gas composition; quantity of fuel injected in the engine; position of an exhaust gas circulation valve; and boost pressure.

It will be understood that the C1 $HC:NO_x$ ratio can be varied according to the or each input received. For example, at lower exhaust gas temperatures a higher ratio is desirable for a pre-determined $NO_2$ conversion, whereas a lower C1 $HC:NO_2$ ratio can be used at higher temperatures.

According to another embodiment, the control means is operated according to stored look-up tables or an engine map in response to at least one of the above inputs.

Adjustment of the C1 $HC:NO_x$ ratio to within the prescribed range can be done either by increasing the amount of HC or by adjusting the $NO_x$ e.g. by adjusting the amount of exhaust gas recirculation. Where HC in the system is to be increased, this can be done in a number of ways, such as by means for injecting the HC into the exhaust gas downstream of the engine; by means for adjusting the ignition timing of at least one engine cylinder; by means for adjusting fuel injection timing of at least one engine cylinder; or, by means for adjusting the engine air-to-fuel ratio.

In one particular embodiment, the inputs are provided by air exhaust gas temperature sensor and a mass flow sensor. Since exhaust gas temperature correlates reasonably with the level of engine-out $NO_x$, and it is possible to model NO oxidation over a catalyst in an exhaust system, such as the CRT®, an estimate of exhaust gas $NO_2$ can be derived. If the mass flow rate is also known it should be possible to calculate how much HC fuel e.g. diesel to inject to obtain the desired C1 $HC:NO_2$ ratio for $NO_2$ decomposition over the catalyst.

In another embodiment, the $NO_2$ decomposition catalyst is disposed downstream of an oxidation catalyst comprising at least one PGM, preferably at least one of platinum and palladium. It is known from EP 0341382 or U.S. Pat. No. 4,902,487 that such catalysts can oxidise NO in the exhaust gas to $NO_2$ at temperatures of up to 400° C. (at higher temperatures, the forward reaction is thermodynamically limited), and this is so even if the intended purpose of the catalyst is to catalyse some other reaction, e.g. the oxidation of diesel particulate matter, CO or a soluble organic fraction or volatile organic fraction of diesel hydrocarbons. However, importantly, where additional HC is introduced into the exhaust system upstream of the $NO_2$ decomposition catalyst, this is done downstream of the oxidation catalyst. This is in clear contradistinction to the arrangement disclosed in EP 0758713 and we believe that the inventors in that case intended to inject the HC upstream of the oxidation catalyst in order to take advantage of any additional $NO_x$ reduction that could be obtained over the PGM oxidation catalyst, or to generate an exotherm over the catalyst for regenerating the diesel particulate filter. Naturally, if a $NO_2$ decomposition catalyst is disposed downstream of an oxidation catalyst and the oxidation catalyst is for generating $NO_2$ for combusting PM on a downstream filter, i.e. the CRT® system, the $NO_2$ decomposition catalyst is disposed downstream of the filter.

According to a further embodiment, the oxidation catalyst is on a particulate filter, e.g. a diesel particulate filter or DPF. Such arrangement is sometimes called a "catalysed soot filter" or CSF. The catalyst can promote the combustion, i.e. reduce the combustion temperature, of soot and particulate matter on the filter. However, the presence of an oxidation catalyst on the filter can also result in increased levels of $NO_2$ leaving the filter section of the filter relative to the amount of $NO_2$ entering the filter.

According to a further embodiment, the oxidation catalyst is associated with a $NO_x$ absorbent material. One such arrangement is that the $NO_x$ absorbent material, typically at least one compound of an alkali metal e.g. potassium or caesium, at least one compound of an alkaline earth metal, such as barium, strontium or calcium, or at least one compound of a rare earth metal, for example lanthanum or yttrium, is associated with the oxidation catalyst. Generally, the compounds will be oxides but, in use, the compounds may also be present as hydroxides, carbonates or, following $NO_x$ absorption (as will be described hereinafter) nitrates.

In this arrangement, $NO_2$ generated over the oxidation catalyst during lambda >1 conditions can be absorbed in the $NO_x$ absorbent material and stored as the nitrate. Since the $NO_x$ absorbent material has a finite capacity to absorb $NO_x$, it is necessary periodically to regenerate it, i.e. to remove the stored $NO_x$. Generally, this may be done by transiently adjusting the lambda composition to lower the oxygen concentration of the exhaust gas, for example by introducing additional HC fuel into the exhaust gas or by allowing less air into the combustion mixture. The resulting exhaust gas is "enriched" but need not result in a lambda <1 composition. The nitrate forms of the alkali, alkaline earth and rare earth metals are understood to be unstable in rich exhaust gas, and so $NO_x$ is released, in what is believed to be a mixture of at least NO and $NO_2$.

Typically, compositions comprising $NO_x$ absorbent materials also comprise rhodium for reducing the $NO_x$ to $N_2$ in the presence of the reductant. However, the rhodium $NO_2$ decomposition catalysts of the present invention do not include other PGM's such as platinum and/or palladium commonly used as oxidation catalysts. In one arrangement, for example, the $NO_2$ decomposition catalyst is on a separate monolith downstream of the filter. In a particular embodiment, however, the $NO_2$ decomposition catalyst can be disposed on a downstream end of the filter.

The filter can be any suitable substrate including a wall-flow filter of ceramic material such as silicon carbide or cordierite. Alternatively, it can be the device described in either EP 1057519 or WO 03/038248.

Examples of suitable zeolite components for the $NO_2$ decomposition catalysts are ZSM-5, β-zeolite, Y-zeolite or mordenite. Suitable silica to alumina molar ratios for such zeolites are from 25 to 400, optionally 30 to 80.

The $NO_2$ decomposition catalysts supporting metals or compounds thereof can be prepared according to known methods such as wet impregnation of the at least one support material using a suitable metal salt followed by calcination, co-precipitation or by ion exchange.

The silica-titania, zirconia-titania or tungsten-titania can be in the form of true mixed oxides or composite oxides. "Composite oxide" as defined herein means a largely amorphous oxide material comprising oxides of at least two elements which are not true mixed oxides consisting of the at least two elements.

In one embodiment, the catalyst for use in the exhaust system according to the invention contains from 0.1 to 5.0 wt % rhodium, such as from 0.25 to 2.5 wt % rhodium, based on the total weight of the particulate refractory oxide.

In a specific embodiment, the catalyst consists essentially of 0.5 wt % rhodium on gamma-alumina.

In a further embodiment, the $NO_2$ decomposition catalyst contains from 1 to 10 wt % copper, such as from 2.5 to 7.5 wt % copper, based on the total weight of the particulate refractory oxide. Where the particulate refractory oxide is a zeolite, it can be impregnated, ion exchanged or co-precipitated onto the refractory oxide.

In a specific embodiment the catalyst consists essentially of 5 wt % copper on zeolite ZSM-5 and/or β-zeolite.

In a further embodiment, the catalyst contains from 1 to 10 wt % iron, such as from 2.5 to 7.5 wt % iron, based on the total weight of the particulate refractory oxide. Where the particulate refractory oxide is a zeolite, it can be impregnated, ion exchanged or co-precipitated onto the refractory oxide.

In a specific embodiment the catalyst consists essentially of 5 wt % iron and the at least one support is zeolite ZSM-5 and/or β-zeolite.

According to a further embodiment, the catalyst contains from 0.1 to 5.0 wt % palladium, such as from 0.25 to 2.5 wt % palladium, based on the total weight of the particulate refractory support.

In a specific embodiment the catalyst consists essentially of 2 wt % palladium on tungsten-titania According to a third aspect, the invention provides an internal combustion engine comprising an exhaust system according to the invention. Such engine can be fuelled by any suitable fuel such as diesel fuel, gasoline fuel, natural gas (NG) or liquid petroleum gas (LPG), but is preferably powered by diesel fuel.

According to a fourth aspect, the invention provides a vehicle, such as a mining vehicle, comprising an engine according to the third aspect of the invention.

It is believed that the $NO_2$ decomposition catalysts described herein, in addition to catalysing the reduction of $NO_2$, may also catalyse the reduction of $SO_3$ to $SO_2$ in exhaust gas conditions and can be used where such reaction is desirable, e.g. to reduce the amount of $SO_3$-derived particulate observed in diesel drive cycles.

EXAMPLE 1

A series of catalysts were analysed on a simulated catalyst activity test (SCAT) gas rig for their abilities to decompose $NO_2$ in a simulated exhaust gas reaction mixture containing 200 ppm $NO_2$, about 120 ppm C1 diesel fuel (MK1), 12% $O_2$, 4.5% $CO_2$, 4.5% $H_2O$ and 20 ppm $SO_2$, $N_2$ balance (C1 $HC/NO_2 \approx 0.6$). Each catalyst was heated in a 10° C.-a-minute ramp in the reaction mixture from 150° C. to 500° C. The catalysts tested were 5 wt % copper ion exchanged ZSM5-30 zeolite ((by total weight of the support) 5 Cu/ZSM5-30), 0.5 wt % rhodium on gamma-alumina ((by total weight of the particulate support) 0.5 Rh/$Al_2O_3$) and 5 wt % copper ion exchanged β-zeolite-30 ((by total weight of the support) 5 Cu/Beta-30).

Figure 2:
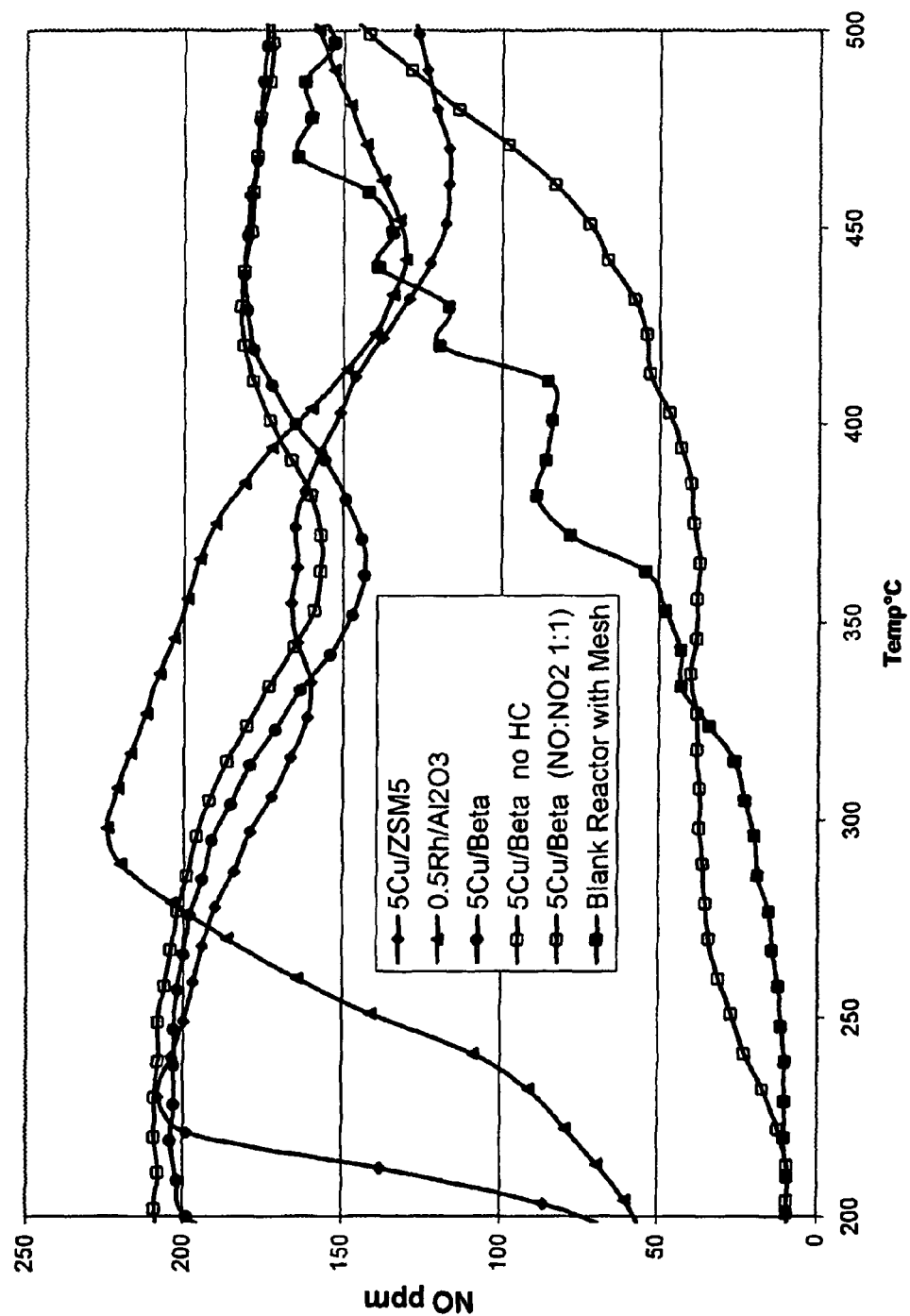
FIG. 2 is a graph showing NO production from $NO_2$ in the presence of diesel fuel as a function of temperature relative to a blank reactor control.

As a control, $NO_2$ decomposition over the blank reactor with mesh was measured and the 5 Cu/β-zeolite-30 catalyst was tested with the above mixture but in the absence of diesel fuel. As a further test, the 5 wt % copper ion exchanged ZSM5-30 zeolite was tested in the above exhaust gas reaction mixture wherein the 200 ppm $NO_2$ was exchanged for 100 ppm NO and 100 ppm $NO_2$, i.e. 1:1 $NO:NO_2$. The results of $NO_2$ decomposition and NO production from $NO_2$ are set out in FIGS. 1 and 2.

It can be seen that the addition of diesel fuel improves the low temperature conversion of $NO_2$ to NO. The 5 Cu/β-zeolite-30 catalyst is the most active catalyst giving 100% $NO_2$ removal from about 200 to about 350° C.

Changing the gaseous $NO_x$ composition from 200 ppm $NO_2$ to 100 ppm NO/100 ppm $NO_2$ has no perceptible effect on the low temperature performance, although the activity does fall off more sharply at higher temperatures when using the $NO/NO_2$ mix. Whether this is due to NO inhibition (perhaps unlikely at this high temperature) or is a kinetic/reaction order effect associated with reducing the inlet $NO_2$ concentration from 200 to 100 ppm is not yet clear.

The mass balances for $NO_2$ decomposition vs. NO production at temperatures in the 300-400° C. range do not correlate. For example, at 350° C. the $NO_2$ removal is 100%, but only around 150 ppm NO is seen in the gas phase (instead of the 200 ppm which we would expect to see if all of the $NO_2$ was being decomposed to NO). We believe, therefore, that we are getting some lean $NO_x$ reduction here, using stored HC and gas phase HC to remove the $NO_x$—the temperature window fits with this hypothesis.

EXAMPLE 2

In a laboratory, a bench mounted, heavy-duty diesel engine fitted with a CRT® exhaust gas after-treatment system as described in EP 0341832, i.e. a platinum on aluminium-based oxidation catalyst for oxidising NO to $NO_2$ and a downstream ceramic wall-flow diesel particulate filter, was used to test the principle of $NO_2$ decomposition shown in Example 1 in "real-world" conditions. A diesel fuel injector was disposed downstream of the filter and a ceramic monolith of 400 cells per square inch (62 cells cm$^{-2}$) was coated with a 5 Cu/Beta-zeolite-30 catalyst of Example 1.

NO and NO$_2$ sensors were used to detect the amounts of these gases at various points in the exhaust system, and the amounts of detected NO$_2$ were used to calculate an amount of diesel fuel to be injected to obtain a C1 HC:NO$_2$ ratio of 0.5 and 0.25 over the catalyst. (Since approximately 50% of NO$_x$ downstream of the CRT® oxidation catalyst at up to about 400° C. is NO$_2$, these values correlate to a C1 HC:NO$_x$ ratio of approximately 1.0 and 0.5 respectively). The engine load was adjusted to increase temperature in the exhaust system and measurements were made after the system had been run at steady state conditions.

Figure 3:
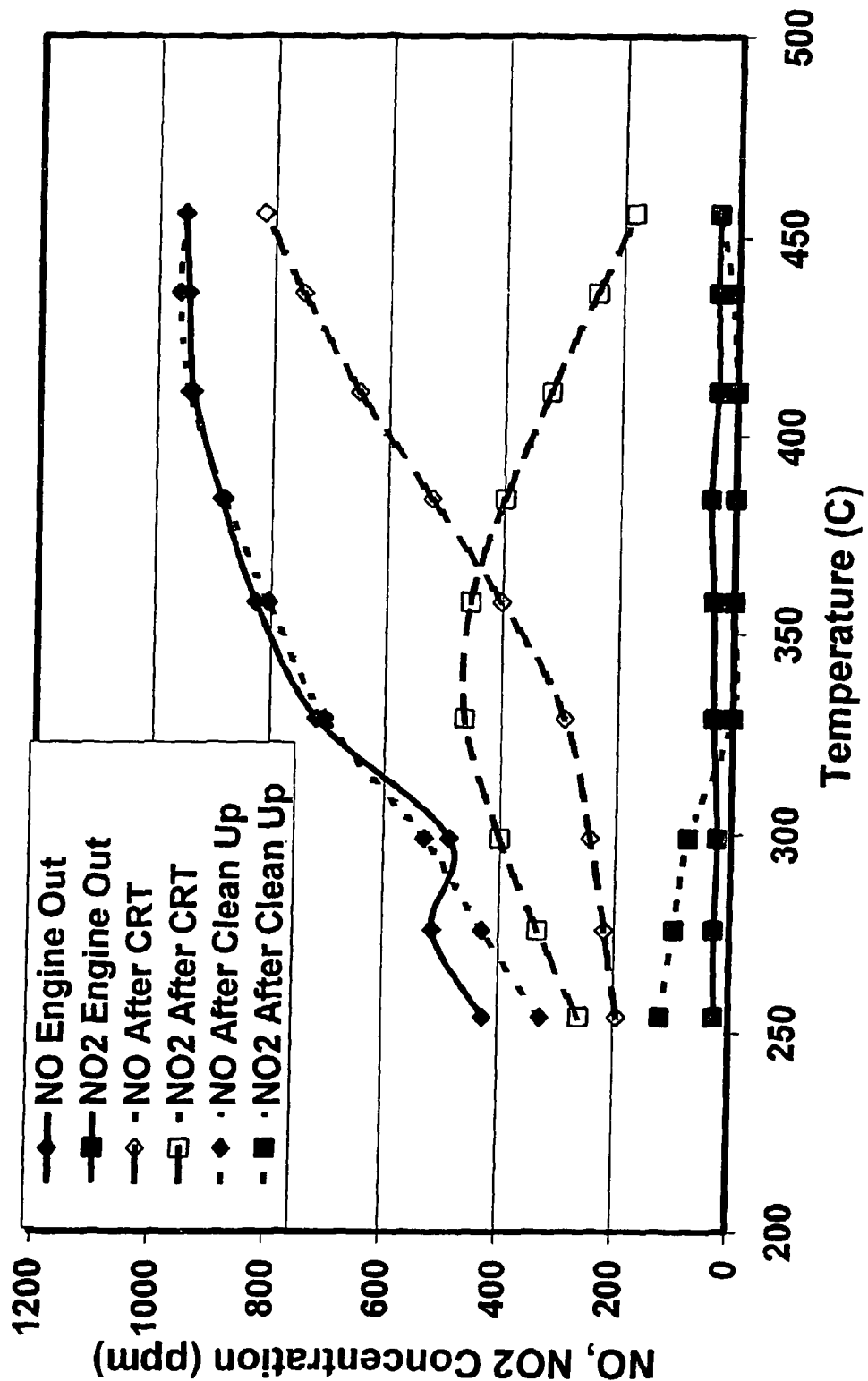
FIG. 3 is a graph showing $NO_2$ decomposition over a Cu/Beta-30 zeolite catalyst at HC:$NO_2$ of 0.5 as a function of temperature.
Figure 4:
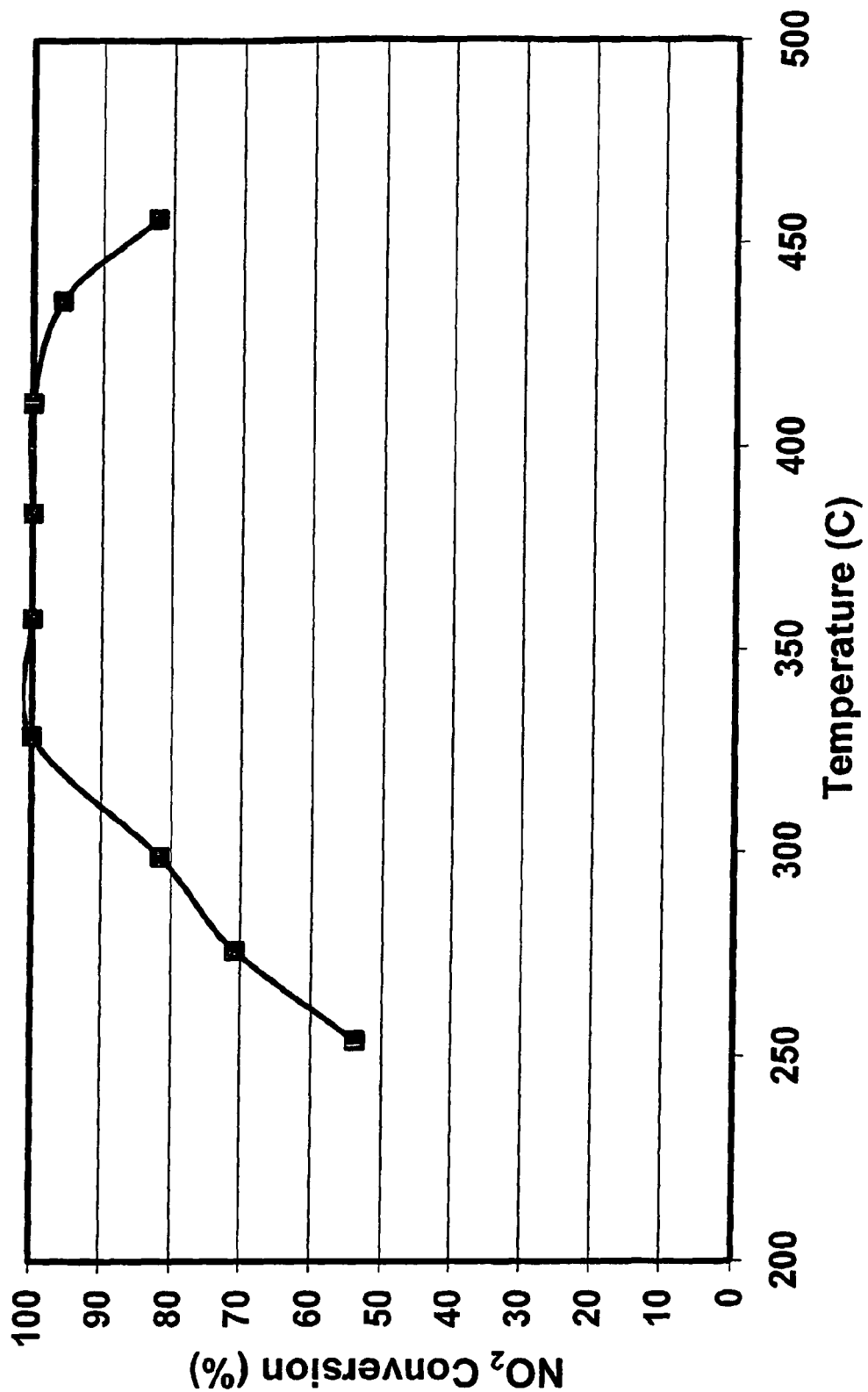
FIG. 4 is a graph showing % $NO_2$ conversion over a Cu/Beta-30 zeolite catalyst at HC:$NO_2$ of 0.5 as a function of temperature.
Figure 5:
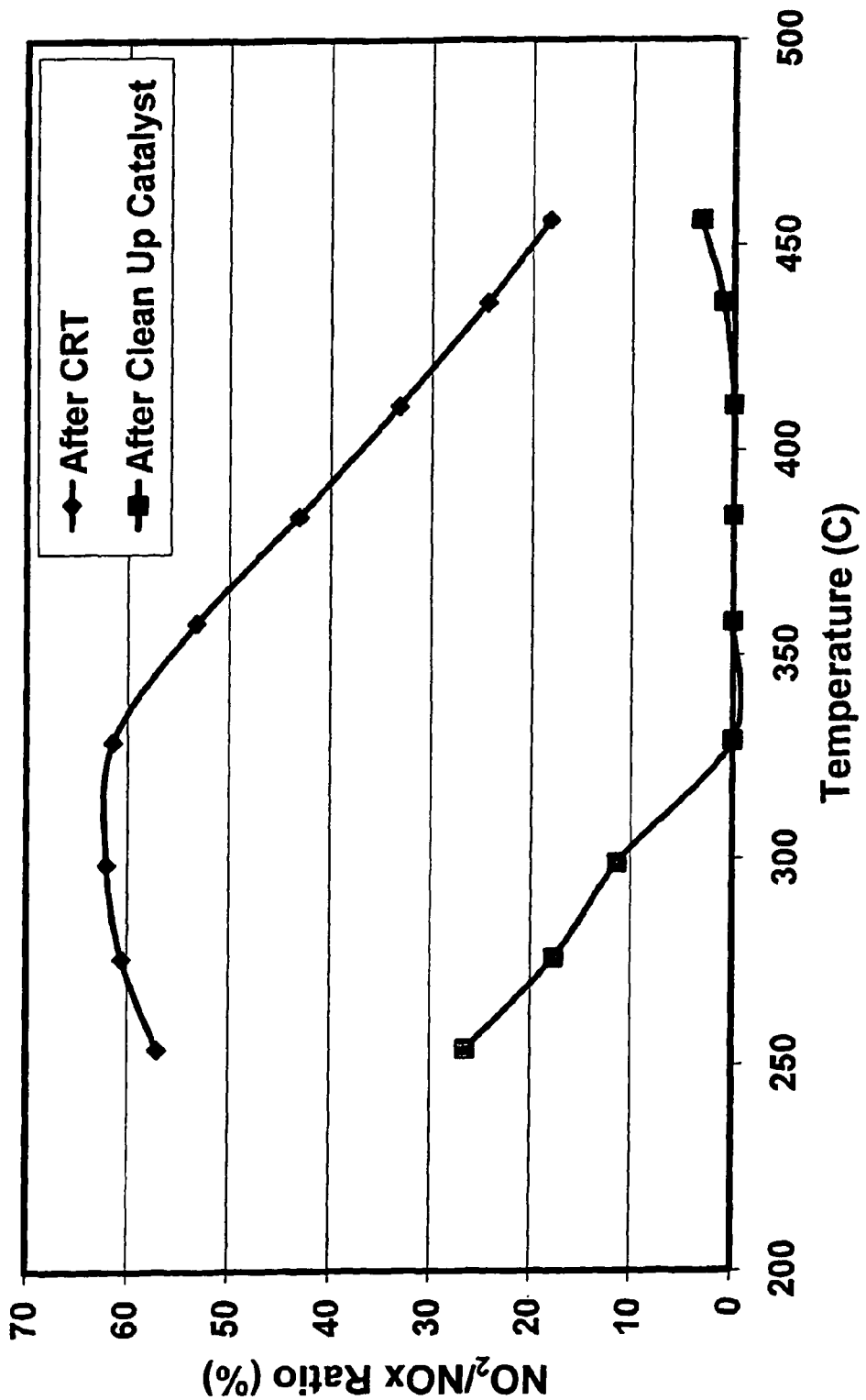
FIG. 5 is a graph showing $NO_2/NO_x$ ratio (%) over a Cu/Beta-30 zeolite catalyst at HC:$NO_2$ of 0.5 as a function of temperature.

FIGS. 3-5 show the results for C1 HC:NO$_2$ of 0.5. In the legends, the NO$_2$ decomposition catalyst is referred to as a "clean-up" catalyst. It can be seen that good NO$_2$ decomposition activity is observed, although the % NO$_2$ decomposition does fall off at temperatures below about 300° C. A small amount of NO$_x$ conversion of 7% peak at about 325° C. is observed (results not shown). Under the conditions used, NO$_2$/NO$_x$ is below 20% at every temperature except the lowest (250° C.). The fall off in NO$_2$/NO$_x$ ratio after the CRT® oxidation catalyst is due to the thermodynamic equilibrium favouring NO over NO$_2$. Negligible HC slip was observed (results not shown).

Figure 6:
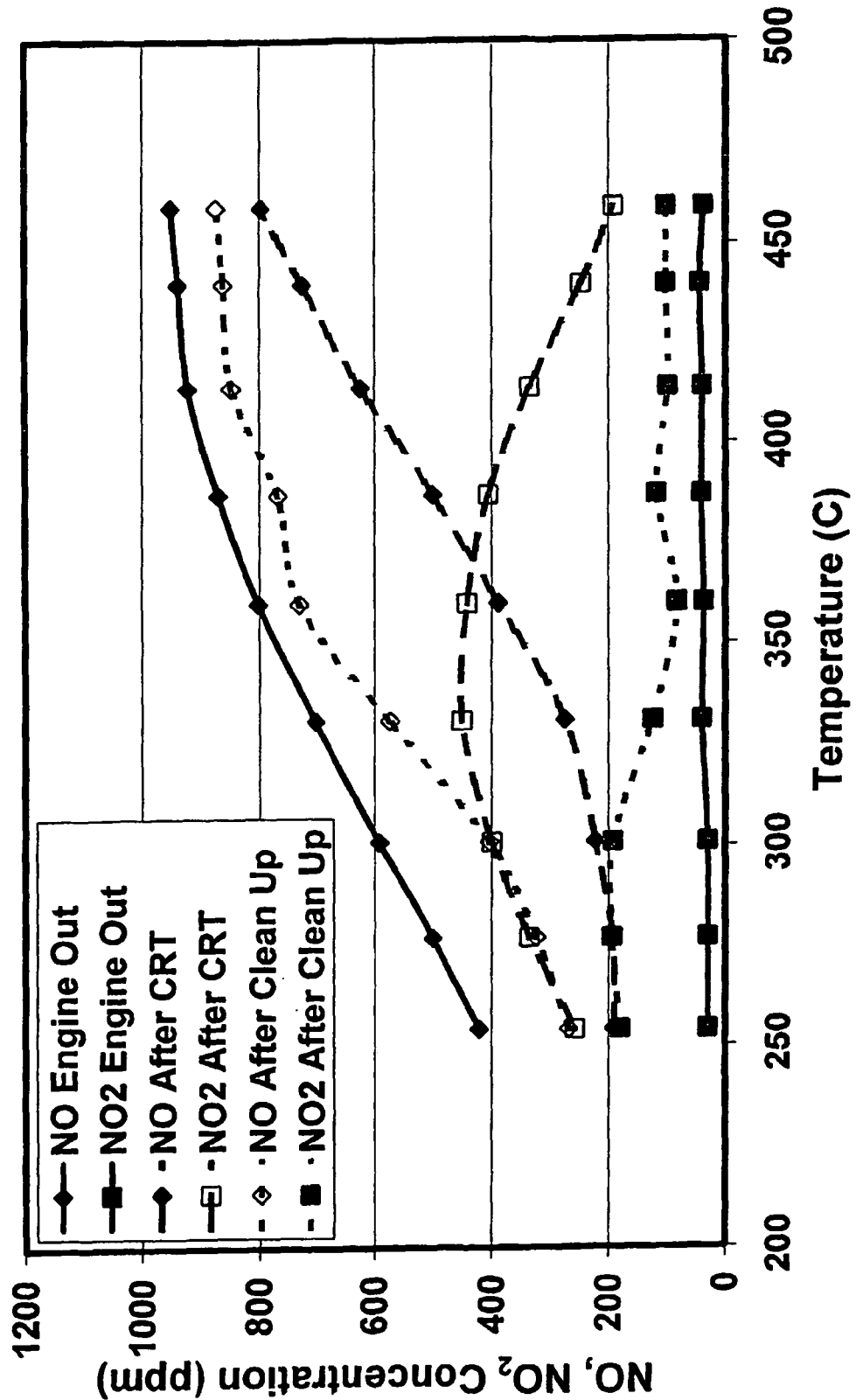
FIG. 6 is a graph showing $NO_2$ decomposition over a Cu/Beta-30 zeolite catalyst at HC:$NO_2$ of 0.25 as a function of temperature.
Figure 7:
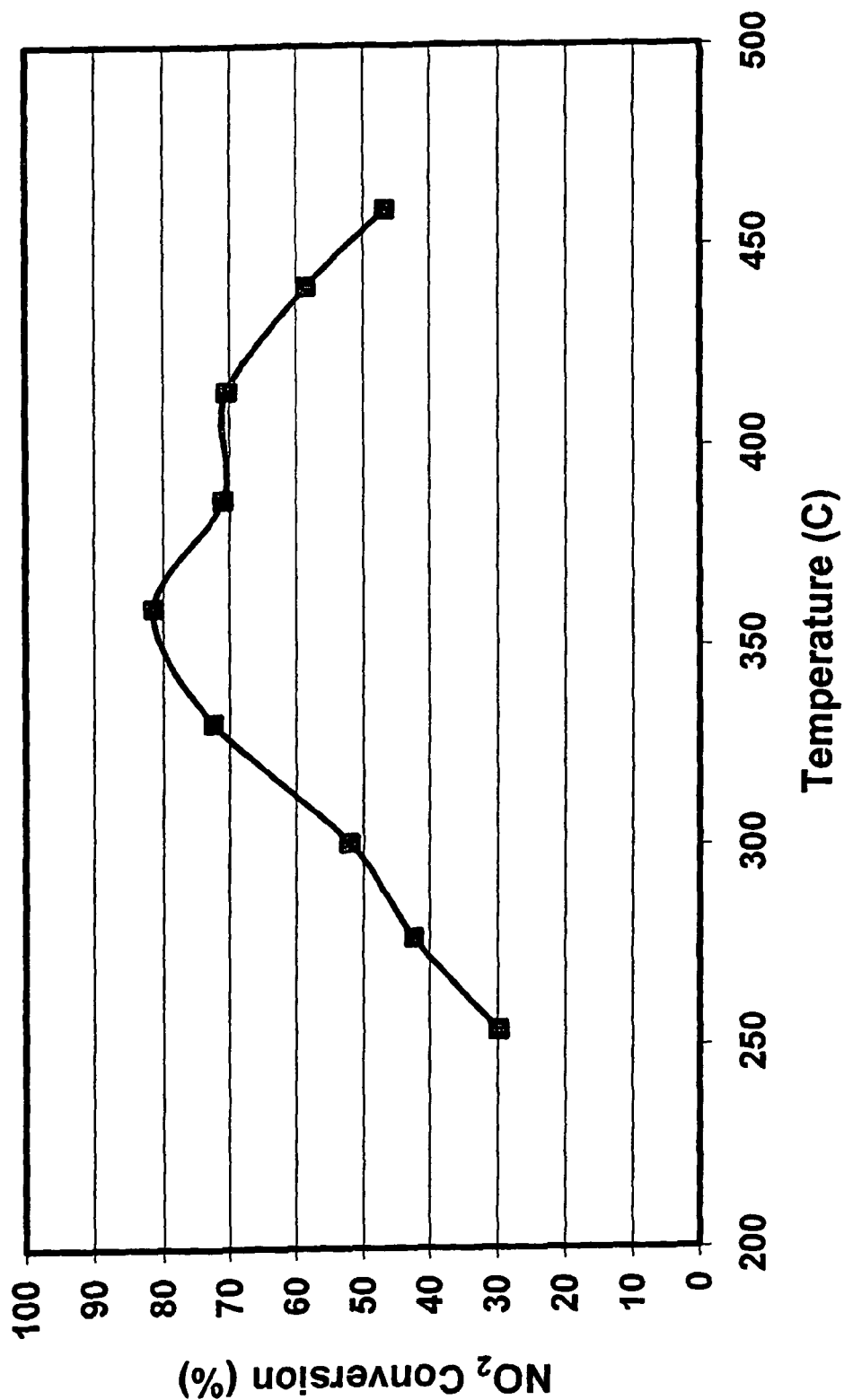
FIG. 7 is a graph showing $NO_2/NO_x$ ratio (%) over a Cu/Beta-30 zeolite catalyst at HC:$NO_2$ of 0.25 as a function of temperature.
Figure 8:
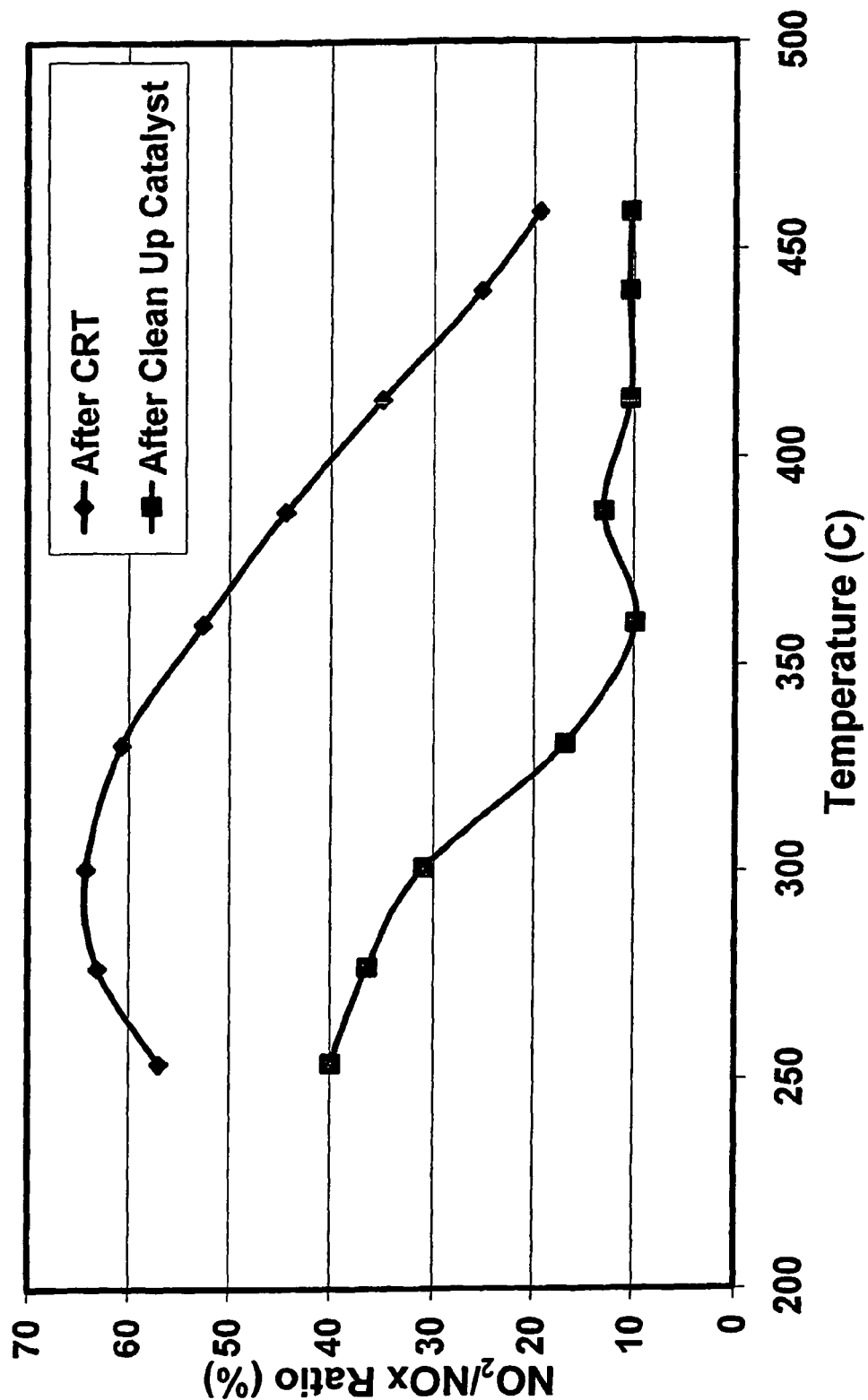
FIG. 8 is a graph showing $NO_2/NO_x$ ratio (%) over a Cu/Beta-30 zeolite catalyst at HC:$NO_2$ of 0.25 as a function of temperature.

At C1 HC:NO$_2$ of 0.25 (results shown in FIGS. 6-8), good NO$_2$ decomposition is still observed, but the conversion peaks at 80%. Again, a small amount of NO$_x$ conversion (peak 6% at 325° C.) was seen. Under the conditions used, NO$_2$/NO$_x$ is below 20% at temperatures above 325° C. Negligible HC slip was observed.

EXAMPLE 3

Figure 9:
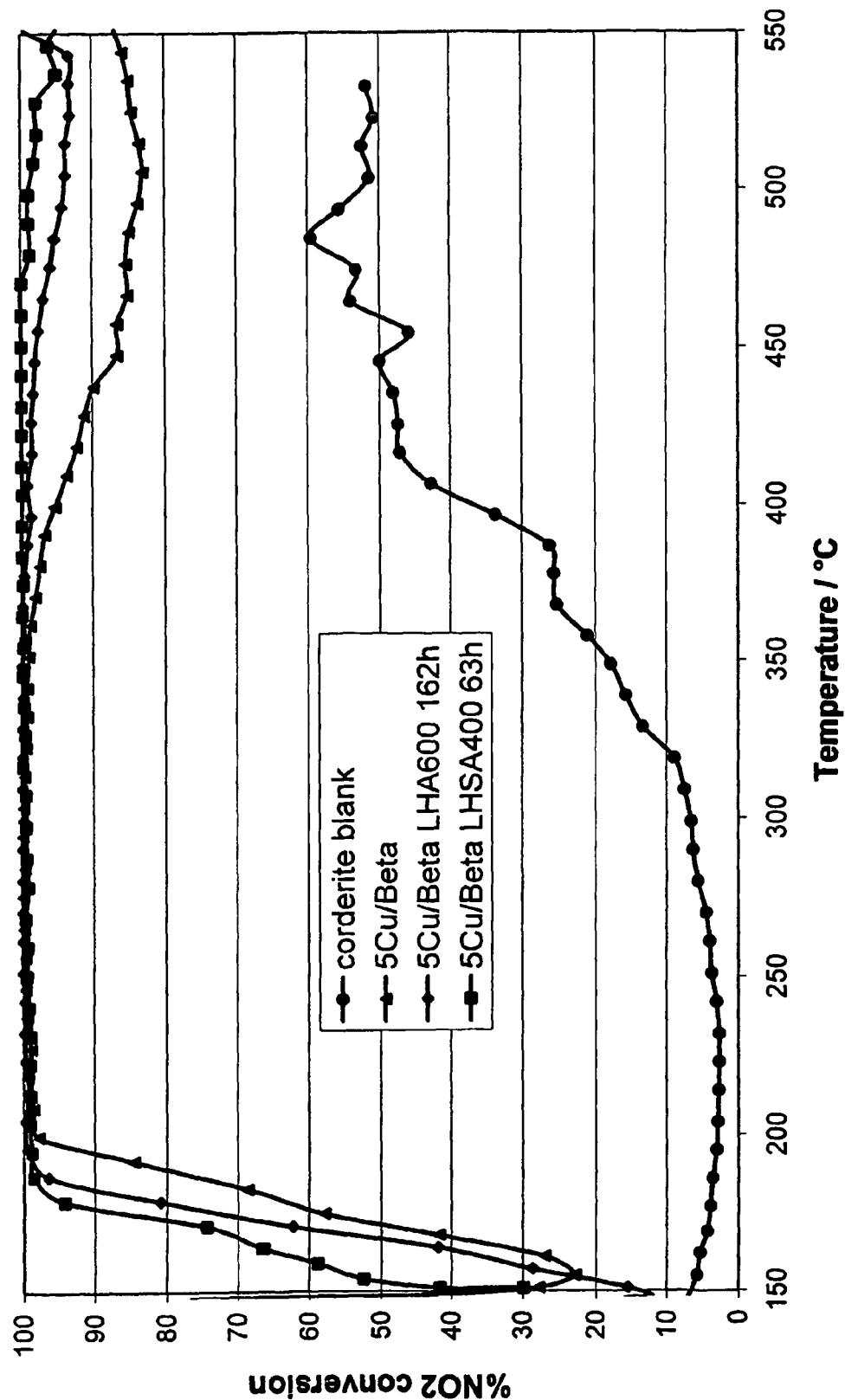
FIG. 9 is a graph showing % $NO_2$ decomposition as a function of temperature comparing the activity of aged 5 Cu/Beta-30 zeolite catalysts.

In order to investigate the effects of catalyst ageing, a 5 Cu/Beta-30 catalyst was aged in air at 500° C., at 400° C. in a gas mixture of air, 10% H$_2$O and 50 ppm SO$_2$ for 63 hours (lean hydrothermal sulphur ageing or LHSA), and at 600° C. for 162 hours in a gas mixture of air and 10% H$_2$O (lean hydrothermal ageing or LHA). The catalysts were tested on a SCAT gas rig for their abilities to decompose NO$_2$ in a simulated gas reaction mixture containing 200 ppm NO$_2$, 100 ppm C1 diesel fuel (MK1), 12% O$_2$, 4.5% H$_2$O, 4.5% CO$_2$, 20 ppm SO$_2$ and N$_2$ balance in the manner otherwise explained in Example 1. The results are shown in FIG. 9.

It can be seen that lean hydrothermal ageing actually improves the % NO$_2$ decomposition activity at lower temperatures. Significantly, lean hydrothermal sulphur ageing increases the low temperature catalyst activity even more. Since LHSA would be expected to sulphate the catalyst components, this observation suggested that the mechanism for catalyst activity involves coking of the catalyst, because sulphation would increase the acidity of the catalyst. Increased activity can increase coking on the catalyst derived from hydrocarbon contacting it. A further series of experiments were organised in order to test this theory.

EXAMPLE 4

Figure 10:
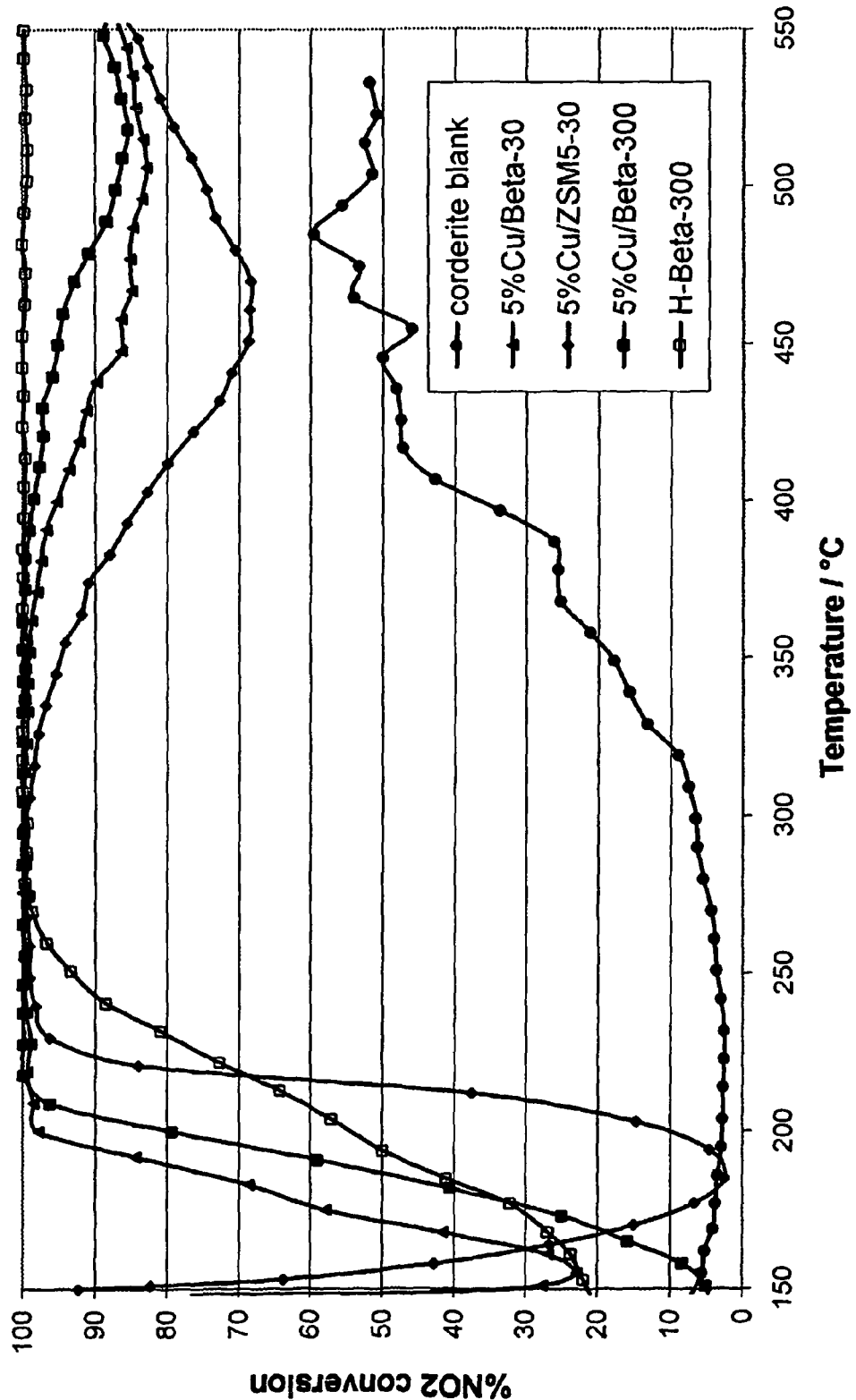
FIG. 10 is a graph showing % $NO_2$ decomposition as a function of temperature comparing the activity of a series of 5 Cu/zeolite catalysts.
Figure 11:
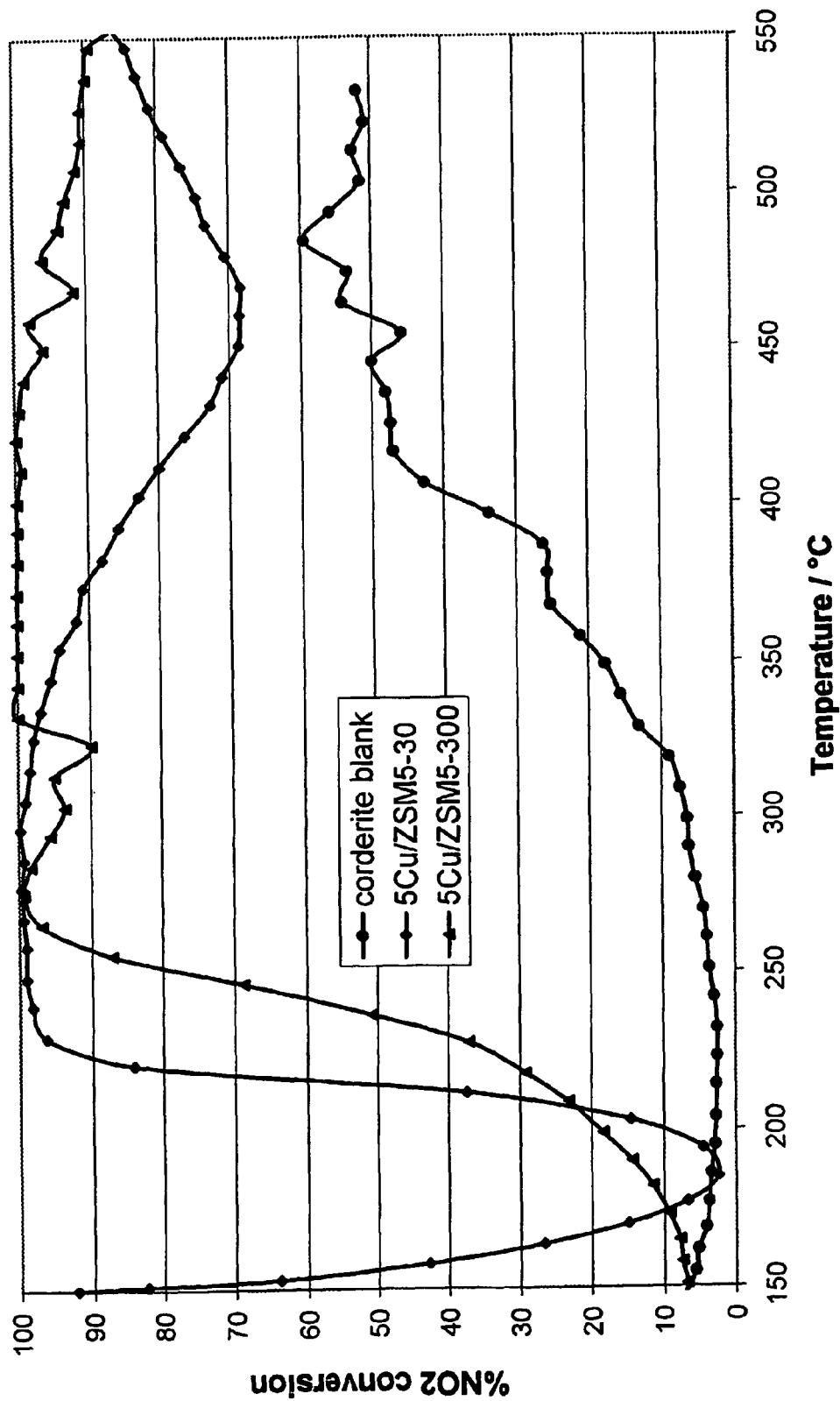
FIG. 11 is a graph showing % $NO_2$ decomposition as a function of temperature comparing the activity of two 5 Cu/ZSM5 catalysts having zeolites of differing silica to alumina molar ratios.

One way of increasing acidity of a zeolite catalyst is to alter the silica to alumina molar ratio of the material. To investigate the theory that catalyst NO$_2$ decomposition activity is linked to catalyst acidity, a series of zeolite-catalysts were tested having different silica to alumina molar ratios. Specifically 5 Cu/ZSM-30 (i.e. a ZSM5 zeolite with a silica to alumina molar ratio of 30), 5 Cu/ZSM-300, 5 Cu/Beta-30, 5 Cu/Beta-300 and non-metallised Beta-300 were prepared and tested on a SCAT gas rig according to the procedures set out in Example 1 in a gas mixture according to Example 3. The results are shown in FIGS. 10 and 11.

It can be seen that the lower silica to alumina molar ratio zeolites, i.e. the more acidic materials, are more active. Also, that non-metallised zeolite is active for NO$_2$ decomposition, but the metallised catalysts are more active. This suggests that the metal has a role in coking. Increasing the silica to alumina molar ratio in β-zeolites does not affect low temperature NO$_2$ decomposition performance as much as ZSM-5.

Figure 12:
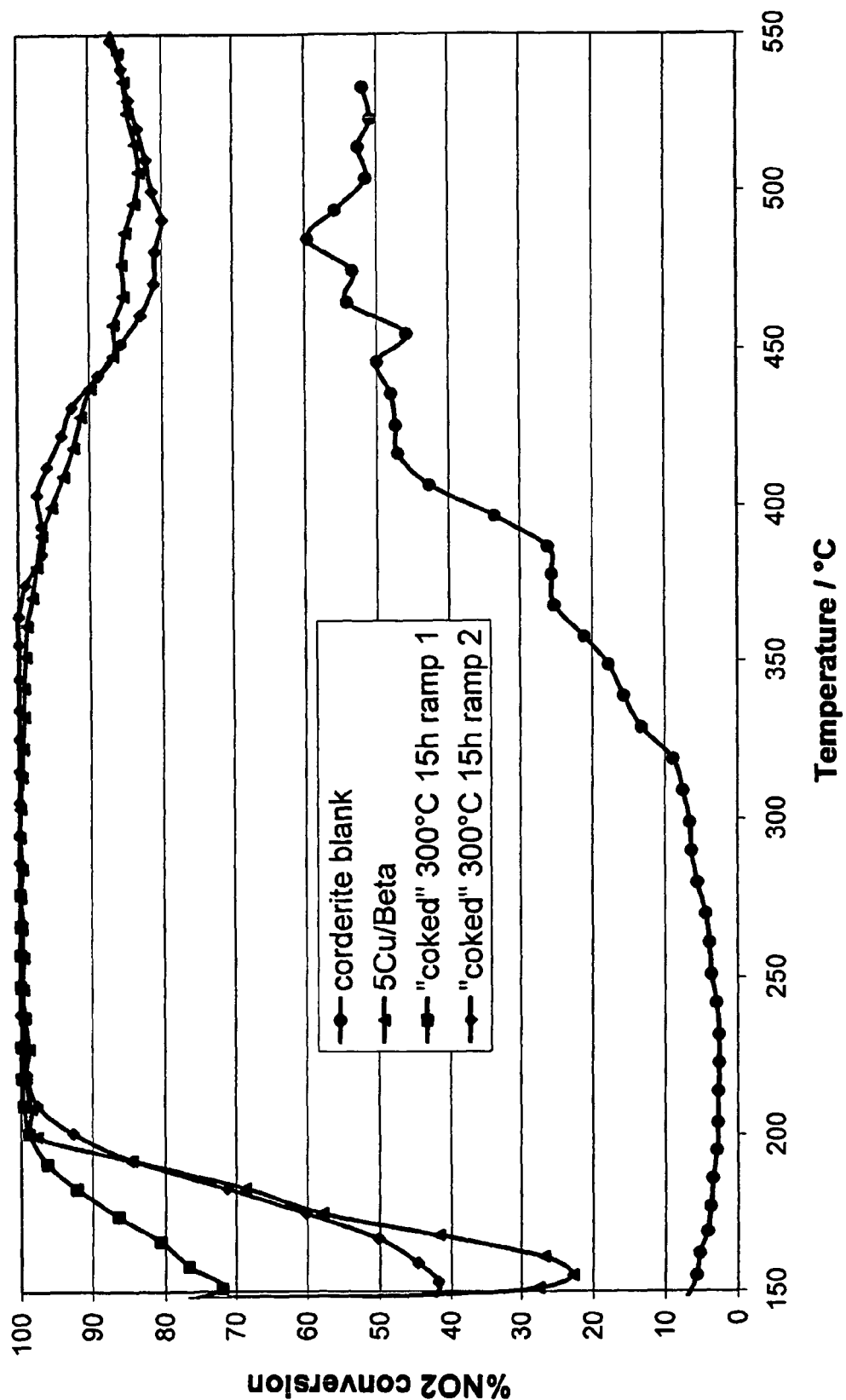
FIG. 12 is a graph showing % $NO_2$ decomposition as a function of temperature comparing the activity of coked and uncoked 5 Cu/Beta-30 catalysts.

A further investigation to show that catalyst coking is involved with NO$_2$ decomposition activity was undertaken. In this experiment, a 5 Cu/Beta catalyst was exposed to a gas mixture intended to induce coking for 10 hours at 300° C. This mixture consisted of 2000 ppm C1 MK1 diesel fuel, 12% O$_2$, 4.5% H$_2$O, 4.5% CO$_2$, 20 ppm SO$_2$, balance N$_2$. The catalyst was tested in a SCAT gas rig using the procedure set out in Example 1 and the gas mixture at Example 3. The results are shown in FIG. 12.

The "coked" sample was tested, then cooled and the same sample was re-tested, hence "ramp 1" and "ramp 2". If coke is involved in the NO$_2$ decomposition reaction, it would be expected that ramp 2 would show less activity than ramp 1 as some coke would be used up in ramp 1, and this was confirmed by the experiment, with the difference in low temperature activity. At higher temperatures, coke may be being replenished by reaction of C1 hydrocarbon in the feed gas on the catalyst.

Figure 13:
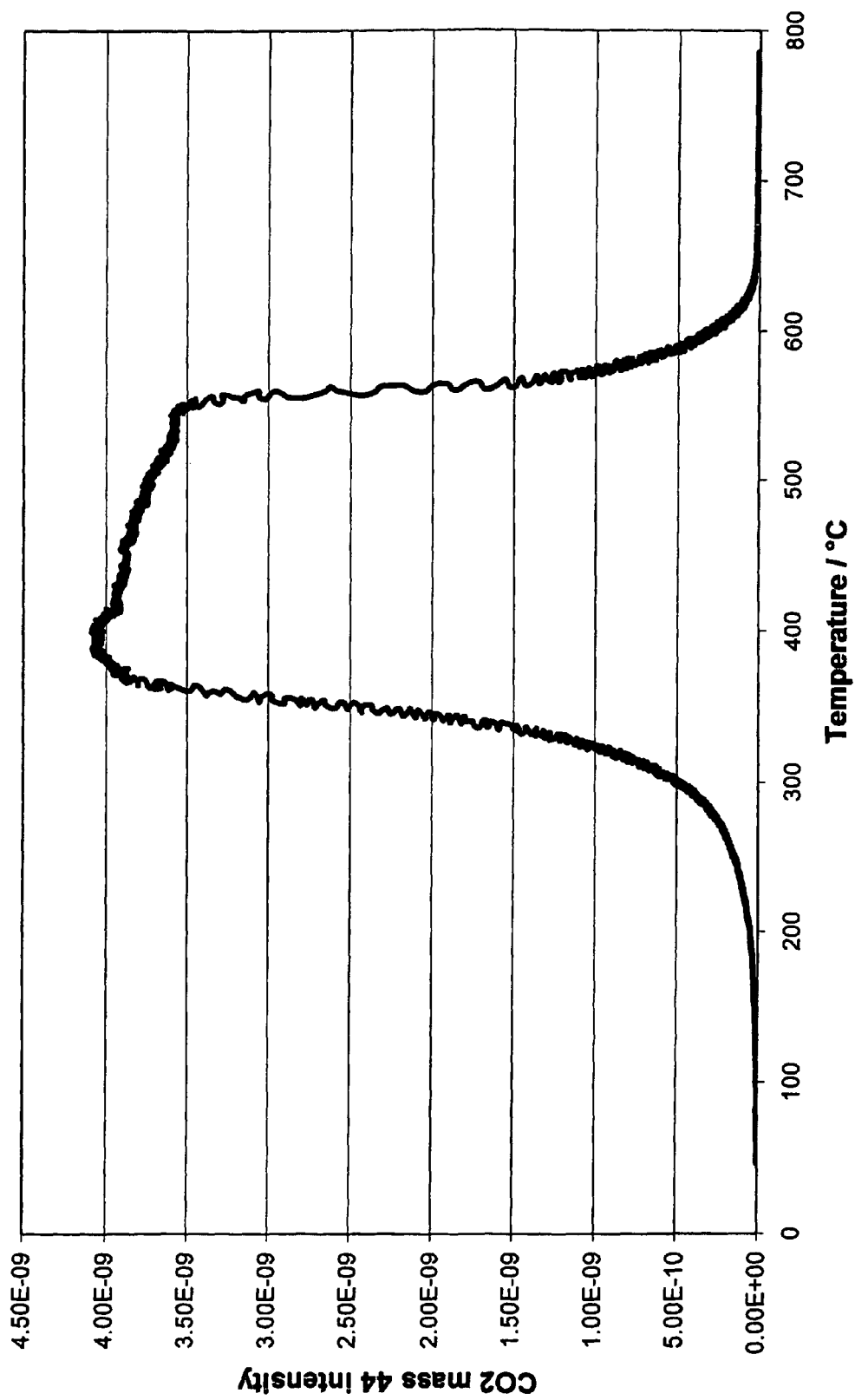
FIG. 13 shows a temperature programmed oxidation (TPO) trace of a "coked" 5 Cu/Beta-25 zeolite catalyst.

A further confirmation of coke formation on the catalysts is shown by temperature programmed oxidation (TPO) analysis of a coked 5 Cu/β-zeolite-25 sample (coking by exposure to 11% O$_2$, C1~700 ppm (MK1 diesel fuel) at 300° C. for 16 hours). TPO analysis was performed on a temperature programmed desorption rig in 5% O$_2$, balance He at a ramp rate of 10° C. min$^{-1}$. Evolution of CO$_2$ was monitored by mass spectrometer. The results are shown in FIG. 13.

EXAMPLE 5

Figure 14:
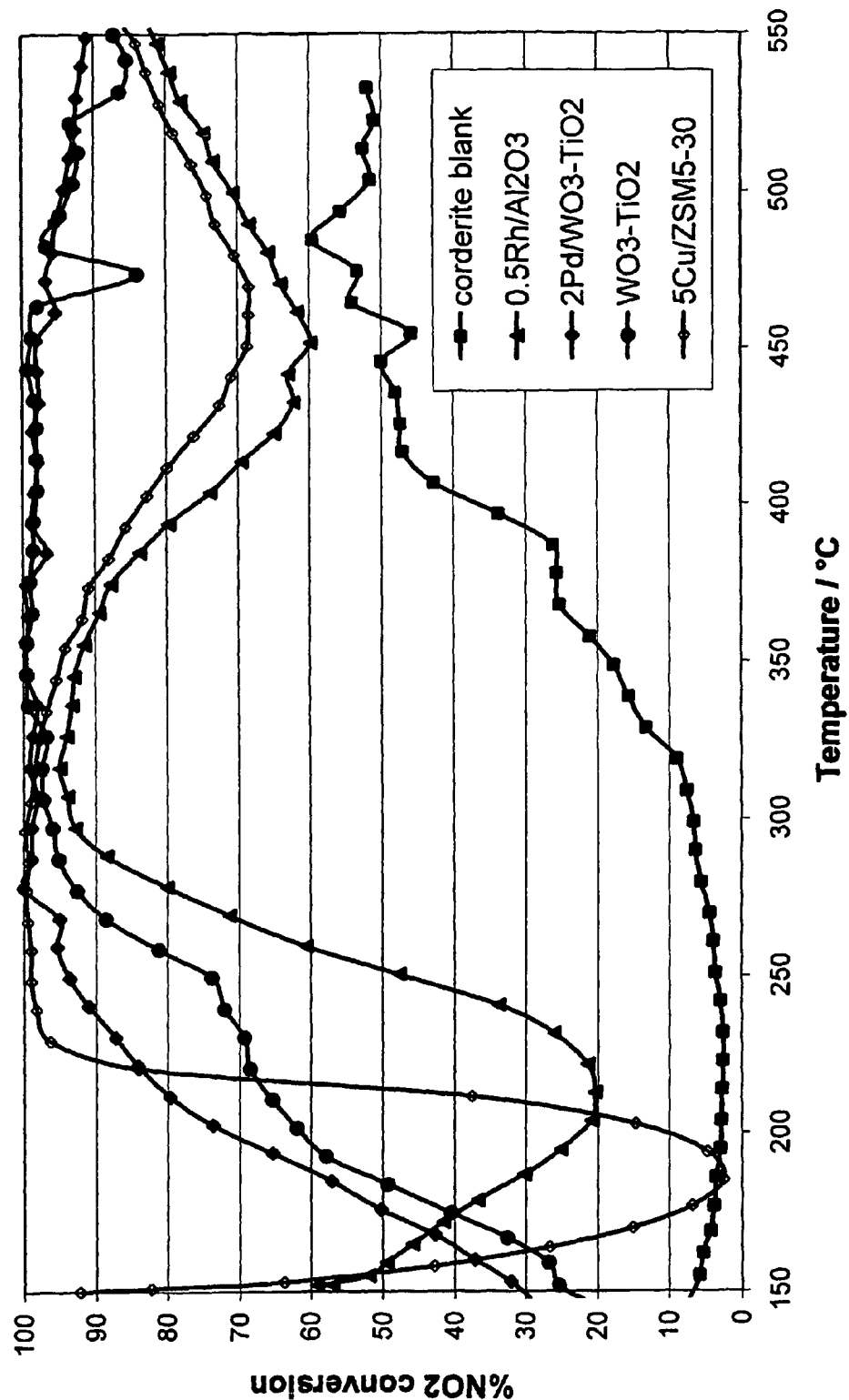
FIG. 14 shows a graph of % $NO_2$ as a function of temperature comparing the activity of a series of non-zeolite catalysts compared to 5 Cu/ZSM5-30.
Figure 15:
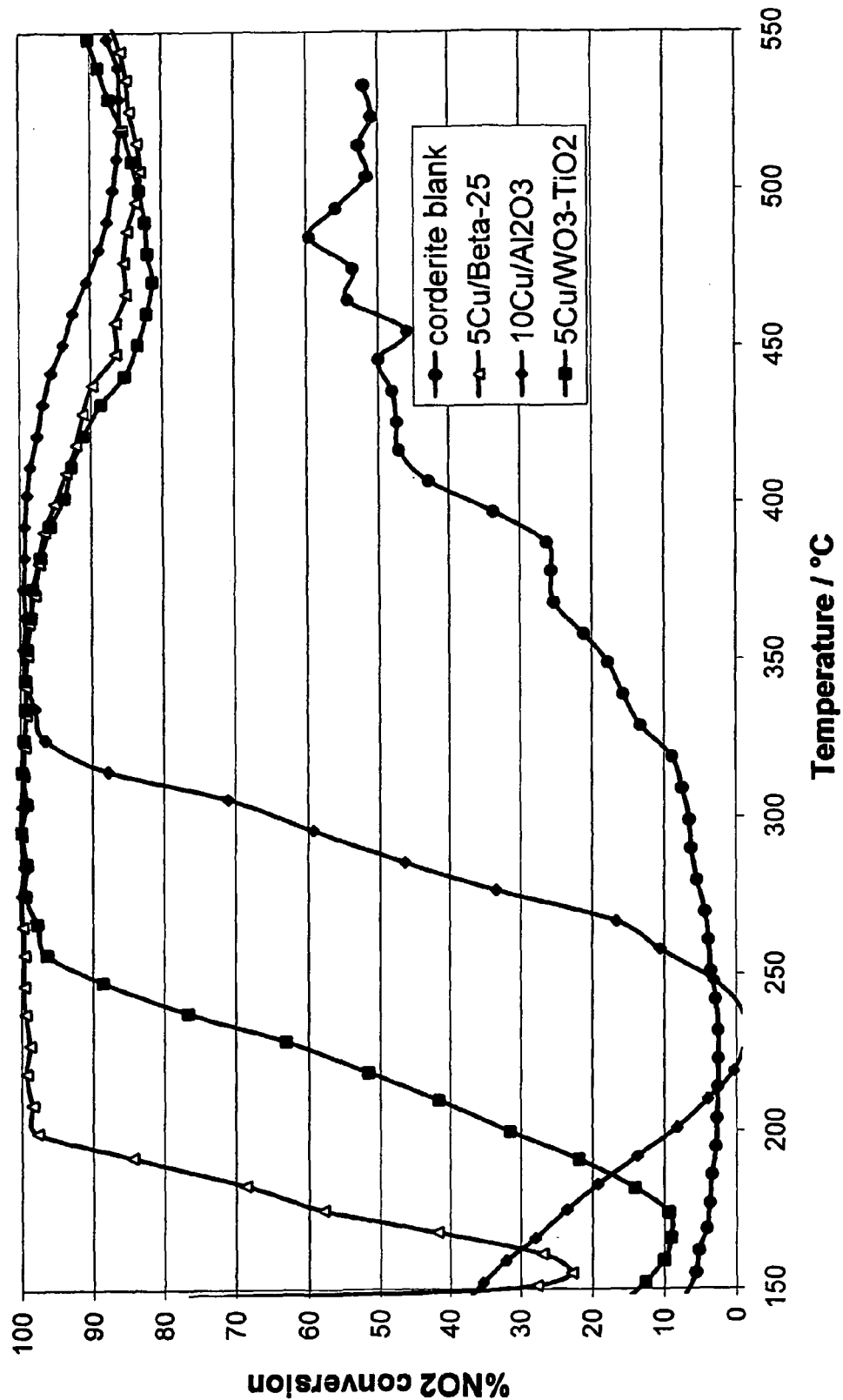
FIG. 15 shows a graph of % $NO_2$ decomposition activity for a series of copper-containing non-zeolite catalysts compared to 5 Cu/Beta-25.

The following non-zeolite catalysts were prepared: 0.5 wt % rhodium on gamma-alumina (0.5 Rh/Al$_2$O$_3$), 2 wt % palladium on tungsten-titania (2 Pd/WO$_3$-TiO$_2$), tungsten-titania per se, 10 wt % copper on gamma alumina (10 Cu/Al$_2$O$_3$) and 5 wt % copper on tungsten-titania (5 Cu/WO$_3$-TiO$_2$). The catalysts were tested in the matter set out in Example 1 using the gas mixture described in Example 3. The results of % NO$_2$ decomposition as a function of temperature are shown on FIGS. 14 and 15, compared with 5 Cu/zeolite catalysts.

The invention claimed is:

1. A method of decomposing nitrogen dioxide (NO$_2$) to nitrogen monoxide (NO) in an exhaust gas of a lean-burn internal combustion engine, which method comprising:
adjusting the C1 hydrocarbon:nitrogen oxides (C1 HC:NO$_x$) ratio of the exhaust gas to from 0.1 to 2;
contacting the gas mixture from the adjusting step with a particulate acidic refractory oxide selected from the group consisting of zeolites, tungsten-doped titania, silica-titania, zirconia-titania, gamma-alumina, amorphous silica-alumina and mixtures of any two or more thereof,
wherein nitrogen dioxide (NO$_2$) present in the gas mixture is converted to nitrogen monoxide (NO); and
passing the effluent gas from the contacting step to atmosphere.

2. The method according to claim 1, further comprising adjusting the C1 HC:NO$_2$ ratio to from 0.2 to 4.

3. The method according to claim 1, wherein the step of adjusting the C1 HC:$NO_x$ ratio in the exhaust gas occurs at temperatures between about 250° C. and about 500° C.

4. The method according to claim 1, wherein the particulate refractory oxide comprises a zeolite selected from the group consisting of ZSM-5, β-zeolite, Y-zeolite, mordenite, and mixtures of any two or more thereof.

5. The method according to claim 1, wherein the step of adjusting the C1 HC:$NO_x$ ratio is effected in response to one or more of the following inputs: exhaust gas temperature; catalyst bed temperature; rate of exhaust gas mass flow; $NO_2$ in the exhaust gas; manifold vacuum; ignition timing; engine speed; throttle position; lambda value of the exhaust gas composition; quantity of fuel injected in the engine; position of an exhaust gas recirculation valve; and boost pressure.

6. The method according to claim 5, wherein the step of adjusting the C1 HC:$NO_x$ ratio is operated according to stored look-up tables or an engine map in response to the at least one input.

7. The method according to claim 1, wherein the step of adjusting the C1 HC:$NO_x$ ratio comprises at least one of: injecting a reductant into the exhaust gas; adjusting an ignition timing of at least one engine cylinder; adjusting fuel injection timing of at least one engine cylinder; adjusting an engine air-to-fuel ratio; and adjusting an exhaust gas recirculation rate.

8. The method according to claim 1, further comprising contacting the exhaust gas with an oxidation catalyst comprising at least one platinum group metal, wherein the $NO_2$ decomposition catalyst is disposed downstream of the oxidation catalyst.

9. The method according to claim 8, further comprising contacting the exhaust gas with a particulate filter disposed between the oxidation catalyst and the $NO_2$ decomposition catalyst.

10. The method according to claim 9, wherein the $NO_2$ decomposition catalyst is disposed on a downstream end of the filter.

11. The method according to claim 8, wherein the adjusting step comprises injecting a reductant into the exhaust system upstream of the $NO_2$ decomposition catalyst and downstream of the oxidation catalyst.

12. The method of claim 8, wherein the at least one PGM metal is selected from the group consisting of platinum, palladium, and mixtures thereof.

13. The method of claim 1, wherein the hydrocarbon is selected from the group consisting of diesel fuel, gasoline fuel, and liquid petroleum gas.

14. The method of claim 1, wherein the hydrocarbon consists of diesel fuel.

15. The method of claim 1, wherein the particulate refractory oxide consists of a zeolite selected from the group consisting of ZSM-5, β-zeolite, Y-zeolite, mordenite, and mixtures of any two or more thereof, wherein the zeolite does not support a metal.

16. The method of claim 1, wherein the C1 hydrocarbon:nitrogen oxides (C1 HC:$NO_x$) ratio of the exhaust gas in the adjusting step is a C1 diesel fuel:nitrogen oxides (C1 HC:$NO_x$) ratio.

* * * * *

UNITED STATES PATENT AND TRADEMARK OFFICE
CERTIFICATE OF CORRECTION

PATENT NO. : 8,092,767 B2
APPLICATION NO. : 10/553490
DATED : January 10, 2012
INVENTOR(S) : Stephen David Pollington et al.

Page 1 of 1

It is certified that error appears in the above-identified patent and that said Letters Patent is hereby corrected as shown below:

On the Title page, Item [75], Inventors,

"Andrew Peter Walker, Malvern, PA"

should read

--Andrew Peter Walker, Chester Springs, PA--.

At column 10, lines 56 and 57,

"contacting the gas mixture from the adjusting step with a particulate acidic refractory oxide"

should read

--contacting the gas mixture from the adjusting step with a catalyst consisting of a particulate acidic refractory oxide--.

Signed and Sealed this
Nineteenth Day of June, 2012

David J. Kappos
*Director of the United States Patent and Trademark Office*